United States Patent [19]

Lesher et al.

[11] Patent Number: 4,847,220

[45] Date of Patent: Jul. 11, 1989

[54] METHOD OF MAKING CERAMIC COMPOSITES

[75] Inventors: H. Daniel Lesher, Wilmington; Christopher R. Kennedy, Newark; Danny R. White, Newcastle; Andrew W. Urquhart, Newark, all of Del.

[73] Assignee: Lanxide Technology Company, LP, Newark, Del.

[21] Appl. No.: 70,006

[22] Filed: Jul. 6, 1987

Related U.S. Application Data

[63] Continuation-in-part of Ser. No. 908,473, Sep. 17, 1986, abandoned.

[51] Int. Cl.$^4$ .................. C04B 35/10; C04B 35/84
[52] U.S. Cl. ........................... 501/89; 501/88; 501/95; 501/97; 501/98; 501/128; 264/60; 264/65; 264/66; 428/378; 428/391
[58] Field of Search ............ 501/88, 97, 98, 89, 501/127, 128, 95; 264/65, 60, 66; 428/391, 378

[56] References Cited

U.S. PATENT DOCUMENTS

| | | | |
|---|---|---|---|
| 2,741,822 | 4/1956 | Udy | 25/157 |
| 3,255,027 | 6/1966 | Talsma | 264/65 |
| 3,296,002 | 1/1967 | Hare | 501/80 |
| 3,298,842 | 1/1967 | Suefert | 501/127 |
| 3,419,404 | 12/1968 | Mao | 501/98 |
| 3,421,863 | 1/1969 | Bawa | 501/128 |
| 3,437,468 | 4/1967 | Suefert | 75/235 |
| 3,473,938 | 10/1969 | Oberlin | 264/65 |
| 3,473,987 | 10/1969 | Sowards | 501/119 |
| 3,538,231 | 11/1970 | Newkirk et al. | 373/117 |
| 3,789,096 | 1/1974 | Church | 264/60 |
| 3,864,154 | 2/1975 | Gazza et al. | 29/123 |
| 3,973,977 | 8/1976 | Wilson | 501/120 |
| 4,238,434 | 12/1980 | Enomoto et al. | 501/88 X |
| 4,372,902 | 2/1983 | Denton et al. | 501/88 X |
| 4,713,360 | 12/1987 | Newkirk et al. | 501/128 X |

FOREIGN PATENT DOCUMENTS

| | | |
|---|---|---|
| 0116809 | 8/1984 | European Pat. Off. . |
| 0155831 | 9/1985 | European Pat. Off. . |
| 0169067 | 1/1986 | European Pat. Off. . |

OTHER PUBLICATIONS

"Oxidation of Molten Aluminum Alloys, Reaction with Refractories"–M. Drouzy and M. Richard–Mar., 1974–Fonderie, France No. 332, pp. 121–128.

"Refractories for Aluminum Alloy Melting Furnaces'–'–B. Clavaud and V. Jost–Sep., 1980–Lillian Brassinga (from French) Jan., 1985.

Primary Examiner—William R. Dixon, Jr.
Assistant Examiner—Karl Group
Attorney, Agent, or Firm—Mark G. Mortenson; William E. McShane

[57] ABSTRACT

The invention relates to a method for producing ceramic composites obtained by oxidation of an aluminum parent metal to form a polycrystalline ceramic material by providing a filler having a coating of a silicon source on at least a portion of said filler different in composition from the primary composition of said filler, said silicon source possessing intrinsic doping properties. A body of molten parent metal, adjacent a mass of the filler material, reacts with an oxidant to form an oxidation reaction product which infiltrates the adjacent mass of filler thereby forming the ceramic composite.

23 Claims, 4 Drawing Sheets

METHOD OF MAKING CERAMIC COMPOSITES

CROSS-REFERENCE TO RELATED APPLICATION

This application is a continuation-in-part of Application Ser. No. 908,473, filed Sept. 17, 1986, in the name of H. Daniel Lesher et al., and entitled "A Method of Making Ceramic Composites."

BACKGROUND OF THE INVENTION

This invention broadly relates to a method of making ceramic composites. More particularly, this invention relates to a method for producing ceramic composites by infiltrating a filler, which is coated with a silicon source having intrinsic doping properties, with an oxidation reaction product grown from an aluminum parent metal precursor.

DESCRIPTION OF THE PRIOR ART

In recent years, there has been an increasing interest in the use of ceramics for structural applications historically served by metals. The impetus for this interest has been the superiority of ceramics to metals with respect to certain properties, such as corrosion resistance, hardness, modulus of elasticity, and refractory capabilities.

Current efforts at producing higher strength, more reliable, and tougher ceramic articles are largely focused upon (1) the development of improved processing methods for monolithic ceramics and (2) the development of new material compositions, notably ceramic matrix composites. A composite structure is one which comprises a heterogeneous material, body or article made of two or more different materials which are intimately combined in order to attain desired properties of the composite. For example, two different materials may be intimately combined by embedding one in a matrix of the other. A ceramic matrix composite incorporates one or more diverse kinds of filler materials such as particulates, fibers, rods, and the like.

Various suitable materials have been employed as a filler in the formation and manufacture of ceramic matrix composites. These fillers have been used in the form of fibers, pellets, particulates, whiskers, etc. These materials include, for example, some of the oxides (single or mixed), nitrides, carbides or borides of aluminum, hafnium, titanium, zirconium, yttrium, and silicon. Certain known materials that have been utilized as a filler, such as silicon carbide and silicon nitride, are not intrinsically stable in a high temperature oxidizing environment (e.g. over 850° C.), but exhibit in such an environment degradation reactions having relatively slow kinetics.

There are several known limitations or difficulties in substituting ceramics for metals, such as scaling versatility, capability to produce complex shapes, satisfying the properties required for the end use application and costs. Several copending patent applications and one patent assigned to the same owner as this application overcome some of these limitations or difficulties and provide novel methods for reliably producing ceramic materials, including composites. An important method is disclosed generically in commonly owned U.S. Pat. No. 4,713,360, which issued on Dec. 15, 1987, in the names of Marc S. Newkirk et al. and entitled "Novel Ceramic Materials and Methods for Making the Same." These applications and patent disclose the method of producing self-supporting ceramic bodies grown as the oxidation reaction product from a parent metal precursor. Molten metal is reacted with a vapor-phase oxidant to form an oxidation reaction product, and the metal migrates through the oxidation product toward the oxidant thereby continuously developing a ceramic polycrystalline body. The process may be enhanced by the use of an alloyed dopant, such as is used in the case of oxidizing aluminum doped with magnesium and silicon in air to form α-alumina ceramic structures. This method was improved upon by the application of dopant materials to the surface of the precursor metal, as described in commonly owned and copending U.S. patent application Ser. No. 220,935, filed June 23, 1988, in the names of Marc S. Newkirk et al. and entitled "Methods of Making Self-Supporting Ceramic Materials". This application was allowed on Nov. 17, 1988.

This oxidation phenomenon was utilized in producing composite ceramic bodies as described in commonly owned and copending U.S. patent application Ser. No. 819,397, filed Jan. 17, 1986, in the names of Marc S. Newkirk et al. and entitled "Composite Ceramic Articles and Methods of Making Same." This application was allowed on Aug. 1, 1988. These applications disclose novel methods for producing a self-supporting ceramic composite by growing an oxidation reaction product from a parent metal precursor into a permeable mass of filler, thereby infiltrating the filler with a ceramic matrix. The resulting composite, however, has no defined or predetermined geometry, shape, or configuration.

A method for producing ceramic composite bodies having a predetermined geometry or shape is disclosed in the commonly owned and copending U.S. patent application Ser. No. 861,025, filed May 8, 1986 in the names of Marc S. Newkirk et al. and entitled "Shaped Ceramic Composites and Methods of Making the Same". In accordance with the method in this U.S. patent application, the developing oxidation reaction product infiltrates a permeable preform in the direction towards a defined surface boundary. It was discovered that high fidelity shape forming is more readily achieved by providing the preform with a barrier means, as disclosed in commonly owned and copending U.S. patent application Ser. No. 861,024, filed May 8, 1986 in the names of Marc S. Newkirk et al. and entitled "Method of Making Shaped Ceramic Composites with the Use of a Barrier." This application was allowed on Oct. 11, 1988. This method produces shaped self-supporting ceramic bodies, including shaped ceramic composites, by growing the oxidation reaction product of a precursor metal to a barrier means spaced from the metal for establishing a boundary or surface. A method of forming ceramic composites having a cavity with an interior geometry inversely replicating the shape of a positive mold or pattern of the parent metal is disclosed in commonly owned and copending U.S. patent application Ser. No. 823,542, filed Jan. 27, 1986 in the names of Marc S. Newkirk et al. and entitled "Inverse Shape Replication Method of Making Ceramic Composite Articles and Articles Obtained Thereby", and in commonly owned and copending U.S. patent application Ser. No. 896,157, filed Aug. 13, 1986 in the name of Marc S. Newkirk and entitled "Method of Making Ceramic Composite Articles With Shape Replicated Surfaces and Articles Obtained Thereby." U.S. patent application Ser. No. 823,542 was allowed on Sep. 20, 1988.

The entire disclosures of all of the foregoing commonly owned patent applications and patent are expressly incorporated herein by reference.

SUMMARY OF THE INVENTION

The present invention broadly provides a method for producing a ceramic composite comprising a ceramic matrix obtained by the oxidation reaction of molten aluminum parent metal with an oxidant, including a vapor-phase oxidant, and a filler coated, at least initially, with a silicon source (defined below) infiltrated by the matrix. The silicon source has a composition different from the primary composition of the filler and the silicon source is at least partially reducible by or dissolved by the molten parent metal under the process conditions. This coating of silicon source, when heated to a suitable temperature preferably, but not necessarily, in an oxygen-containing environment, possesses intrinsic doping properties for enhancing the oxidation reaction, and the essentially unaltered or remaining portion of the filler, serving as filler, is incorporated into the developing matrix, as explained below in greater detail.

The self-supporting ceramic composite is produced by initially forming a bed or mass of filler material, part or all of whose constituents are coated with a silicon source. The silicon source is different in composition from the primary composition of the filler. The filler may be overlaid at least partially with a barrier means which is at least partially spaced from the aluminum parent metal for establishing a surface or boundary of the ceramic matrix.

The filler bearing the silicon source, which may be used in combination with other filler materials, either in the form of a layup, packed bed or preshaped as a preform, is positioned or oriented adjacent to the aluminum parent metal such that formation of the oxidation reaction product will occur in a direction towards the oxidant and filler, and towards the barrier means if the same is utilized. The bed of filler material or preform should be sufficiently permeable to permit or accommodate growth of the oxidation reaction product within the bed, and to permit the gaseous oxidant to permeate the preform and contact the molten metal. The parent metal is heated to a temperature above its melting point but below the melting point of the oxidation reaction product to form a body of molten metal. At this temperature, or within this temperature range, the molten metal reacts with the oxidant to form the oxidation reaction product. At least a portion of the oxidation reaction product is maintained in contact with and between the molten metal and the oxidant to draw molten metal through oxidation reaction product towards and into contact with the oxidant such that the oxidation reaction product continues to form at the interface between the oxidant and previously formed oxidation reaction product, thus infiltrating the adjacent filler material. The reaction is continued for a time sufficient to infiltrate at least a portion of the filler material with a polycrystalline material consisting essentially of the oxidation reaction product and one or more metallic constituents, such as unoxidized constituents of the parent metal or of the dopant, dispersed or distributed through the polycrystalline material. It should be understood that the polycrystalline matrix material may exhibit voids or porosity in place of the metal phase, but the volume percent of voids will depend largely on such conditions as temperature, time, dopants, and type of parent metal. If a barrier means has been used, the ceramic body will continue to grow to the barrier, provided sufficient parent metal is present.

As explained in the aforesaid Commonly Owned Patent Applications and patent, the use of dopant materials can favorably influence or promote the oxidation reaction process. Silicon is a useful dopant with an aluminum parent metal, especially in combination with other dopants, and can be applied externally of the parent metal, and a useful source for such a dopant is silica. Under the process conditions of this invention, a silicic compound as the silicon source (e.g. silica) is reduced by the molten aluminum parent metal to form alumina and silicon. Thus, the silicic compound coating on the filler material is a useful dopant in promoting the development or growth of the oxidation reaction product. For example, silicon carbide will oxidize at or on the surface at elevated temperatures in air to form a silica film, and therefore silicon carbide is a particularly useful filler in that it serves not only as a filler material but also as a dopant source. The silica film is reduced by the molten aluminum parent metal to yield a silicon dopant which promotes growth of the polycrystalline matrix through the silicon carbide filler. In addition, the silica coating on silicon carbide particles is advantageous in that during the matrix formation reaction it increases the local silicon concentration in the unoxidized aluminum parent metal and thereby reduces the tendency for formation of $Al_4C_3$ during the matrix growth process. $Al_4C_3$ is undesirable because it is unstable in the presence of moisture levels normally present in ambient air, resulting in the evolution of methane and the degradation of the structural properties of the resulting composite.

It has been discovered for purposes of this invention that, in conducting the oxidation reaction, preferably in an oxygen-containing environment, the coating of silicon source serves as a dopant material for the oxidation reaction of the parent metal. The remaining portion of the filler beneath the coating, being of a different composition, is substantially unchanged and serves as a filler in the composite. For example, the filler may bear a silicic compound which is reducible by the molten metal, or the filler may be coated with silicon which is dissolvable by the molten metal. It should be understood that substantially all of the silicon source may be utilized as a dopant, or a portion only is utilized as dopant, the remainder being with the filler and becoming embedded by the matrix. Certain fillers, such as silicon carbide, will oxidize to form $SiO_2$ at the elevated temperatures of the process, and the conditions are controlled to limit the oxidation so as to produce a silica coating reducible by the molten parent metal. When desired, a separate coating material may be applied to the filler which, on heating, produces the silicic compound. The coating of silicon source, e.g. silicic compound, may be formed or produced by first prefiring or heating a suitable filler in an oxygen-containing atmosphere. The prefired filler having thereon the coating is employed subsequently as a filler material. For example, a preform can be fabricated of silicon carbide particulate or alumina particulate coated with a siliceous precursor or compound such as tetraethyl orthosilicate. The preform is then prefired or heated in air to form an oxide skin of silica on the silicon carbide particles or alumina particles of the preform. The preform then can be employed as a ceramic composite raw material possessing an intrinsic source of silicon dopant material. Alternatively, the particulate of silicon carbide or alumina with the siliceous coating can be used in the setup of filler material and parent metal, and the silica film or coating is formed in situ during the oxidation reaction process in the presence of an oxygen-containing gas. The primary composition of the filler particulate (e.g. silicon carbide or alumina particulate) remains intact and serves as the filler material for the composite.

The materials of this invention can exhibit substantially uniform properties throughout their cross-section to a thickness heretofore difficult to achieve by conventional processes for producing ceramic structures. The process which yields these materials also obviates the high costs associated with conventional ceramic production methods, including the preparation of fine, high purity, uniform powders and their densification by such methods as sintering, hot pressing, or isostatic pressing.

The products of the present invention are adaptable or fabricated for use as articles of commerce which, as used herein, is intended to include, without limitation, industrial, structural and technical ceramic bodies for such applications where electrical, wear, thermal, structural, or other features or properties are important or beneficial; and is not intended to include recycle or waste materials such as might be produced as unwanted by-products in the processing of molten metals.

As used in this specification and the appended claims, the terms below are defined as follows:

"Ceramic" is not to be unduly construed as being limited to a ceramic body in the classical sense, that is, in the sense that it consists entirely of non-metallic and inorganic materials, but, rather refers to a body which is predominantly ceramic with respect to either composition or dominant properties, although the body may contain minor or substantial amounts of one or more metallic constituents derived from the parent metal or produced from the oxidant or a dopant, most typically within a range of from about 1–40% by volume, but may include still more metal.

"Oxidation reaction product" generally means aluminum as the parent metal in any oxidized state wherein the metal has given up electrons to or shared electrons with another element, compound, or combination thereof. Accordingly, an "oxidation reaction product" under this definition includes the product of reaction of the aluminum metal with an oxidant such as those described in this application.

"Oxidant" means one or more suitable electron acceptors or electron sharers and may be a solid, a liquid or a gas (vapor) or some combination of these (e.g., a solid and a gas) at the process conditions.

"Parent metal", refers to aluminum, which is the precursor for the polycrystalline oxidation reaction product, and includes relatively pure aluminum, commercially available aluminum with impurities and/or alloying constituents, or an alloy of aluminum in which aluminum as the precursor is the major or most significant constituent in forming the oxidation reaction product.

"Silicon source" refers to elemental silicon or a silicic compound which will provide a dopant material and/or promote wetting of the filler by the molten parent metal under the process conditions.

DETAILED DESCRIPTION OF THE INVENTION AND PREFERRED EMBODIMENTS

Figure 1A:
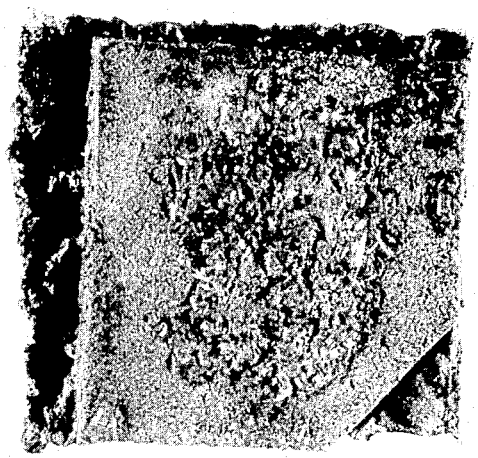
FIG. 1, 2, and 3 are photographs in plan and side views, respectively, of a composite prepared in accordance with Example 2. In each of these figures a portion of the grown composite has been removed by sectioning for further analysis.
Figure 1B:
Figure 2A:
Figure 2B:
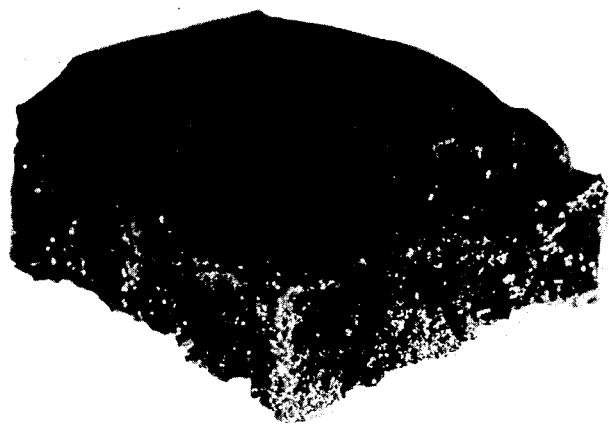

In practicing the process of the present invention, the aluminum parent metal, which may be doped with additional dopant material (as explained below in greater detail) and is the precursor to the oxidation reaction product, is formed into an ingot, billet, rod, plate, or the like. A mass or body of filler material comprising a particulate, powders, fibers, whiskers, or other suitable shapes having a coating of a silicon source is oriented relative to the aluminum parent metal so that the direction of growth of the oxidation reaction product will be towards and into the filler. The composition of the coating is different from the primary composition of the filler, and, if a silicic compound, also is reducible by the molten aluminum parent metal, thereby promoting the oxidation reaction by serving as a dopant. It is also believed that the silicon source also serves to enhance wettability of the filler by the parent metal. The bed is permeable to the vapor-phase oxidant (e.g. air), and to the growth of oxidation reaction product matrix in order to permit development of the oxidation reaction product and infiltration thereby of the filler. As explained in the Commonly Owned Patent Applications, dopant materials favorably influence the oxidation reaction process of parent metals, and silicon, silicon dioxide and similar silicon-containing compounds are useful dopant sources in systems employing aluminum as the parent metal. In accordance with one preferred embodiment of this invention, a silicic compound, when heated to a suitable temperature in an oxygen-containing atmosphere, forms an oxide coating which serves as a dopant material. The formation of the oxide coating on the filler may be accomplished in a prefiring step or in situ during formation of the ceramic body in the presence of an oxygen-containing gas as oxidant. Unless otherwise stated, the terms "filler" or "filler material" are intended to mean either a mass, bed or a preform comprising the filler material at least partially coated with a silicon source, which may be used in combination with other filler materials bearing no such coating.

The filler itself may react, as in the case of silicon carbide, to form a coating of a silicic compound which is reducible by the molten aluminum parent metal. Thus, in such a case the filler, per se, has intrinsic doping properties as provided by the coating, and the remaining unchanged or unaltered portion serves as the filler upon infiltration by the oxidation reaction product. Particularly suitable fillers of this type include silicon carbide and silicon nitride. With materials of this type, a silica coating or silicate coating is formed on heating in air or other suitable oxygen-containing gases. Where desired, the filler may have a suitable coating of a silicon source or silicic precursor applied to a filler of an entirely different composition. For example, a particularly useful system of this type is tetraethyl orthosilicate applied to zirconium oxide fibers, which on drying or mild heating to dissociate the material, will form a silica coating. As a further example, ethyl silicate glass may be applied to an alumina particulate, which on heating forms a coating of silica.

In accordance with one embodiment of the invention, a suitable filler such as silicon carbide or silicon nitride in particulate form is prefired or heated in an oxygen-containing atmosphere, e.g. air, at a temperature sufficient to form a coating of silica on a substantial portion of the particulate. For example, in using silicon carbide as the filler, prefiring desirably is at a temperature of from about 1000° C. to about 1450° C., and preferably 1200°-1350° C. The time required for producing the oxide coating on such fillers depends on such factors as particle size, shape, porosity and availability of oxidant. For silicon carbide having a mesh size of about 250 to 750, a suitable prefiring time is about 5 to 40 hours. Another advantage of prefiring is to produce a thicker silica coating than could be produced during the time required for matrix formation.

In another embodiment, the silicon dioxide film or coating is formed in situ during the oxidation reaction process with an oxygen-containing gas as oxidant. The setup of aluminum parent metal and filler, placed in a suitable refractory vessel, is heated to a temperature not only above the melting point of the parent metal, but also high enough to form a sufficient silica coating on the filler. In this embodiment, the vapor-phase oxidant utilized in the matrix-forming oxidation reaction also reacts with the filler to form the silicon dioxide skin. For example, in using silicon carbide filler infiltrated by an alumina matrix as the oxidation reaction product of aluminum parent metal and an oxygen-containing vapor-phase oxidant, preferably air, the oxide coating will form on the silicon carbide particles at a suitable temperature. The setup first is heated to a temperature between about 1000°-1450° C., and more preferably between about 1200°-1350° C. After the silica film or coating has formed on the silicon carbide filler material, this temperature range can be maintained or can be altered for continuing the oxidation reaction process and to develop the ceramic composite structure.

In still another embodiment of the invention, the filler material may be coated with silicon such as by chemical vapor deposition. This may be particularly useful in the case of fillers, typically as fibers, particles, or whiskers, which need to be protected against degradation under the proces conditions. For example, boron nitride particles need to be protected from oxidation and reaction with molten aluminum, and the silicon coating affords this protection and yet meets the other criteria of the invention.

The filler materials such as silicon carbide and silicon nitride are preferably in particulate form, and may include an admixture of different grit or mesh sizes, preferably about 10-1000 mesh, but finer particulate may be used. However, in the case of silicon nitride, it is desirable to use relatively coarse material to prevent excessive oxidation or reaction to form aluminum nitride and silicon. In this manner, the admixed filler can be tailored to produce a filler material possessing desired end properties, such as permeability, porosity, density, etc.

The filler typically is bonded as a bed or preform with any suitable binding material, agent, compound, or the like, which does not interfere with the reactions of this invention, or leave a significant amount of undesirable residual by-products within the ceramic composite product. Suitable binders have been found to include, for example, polyvinyl alcohol, epoxy resins, natural and synthetic latex, and the like, which are well known in the art. The filler, with or without a binding agent, may be formed into any predetermined size and shape by any conventional method, such as slipcasting, injection molding, transfer molding, vacuum forming, etc.

It is preferable that the filler material be preshaped, having at least one surface boundary, and should retain sufficient shape integrity and green strength, as well as dimensional fidelity, during processing and formation of the ceramic body. The filler bed or preform, however, should be permeable enough to accommodate the growing polycrystalline matrix material. For example, a silicon carbide or silicon nitride preform useful in this invention has a porosity of between about 5 and about 90% by volume, and, more preferably, between about 25 and about 75% by volume.

In conducting the process, the filler, which may be prefired and/or preshaped, is placed adjacent to one or more surfaces, or a portion of a surface, of the aluminum. The filler material preferably is in contact with an areal surface of the parent metal; but where desired, may be partially immersed, but not totally immersed, in the molten metal because complete immersion would cut off or block access of the vapor-phase oxidant into the filler material for proper development of the polycrystalline matrix. Formation of the oxidation reaction product will occur in a direction towards and into the filler material.

The setup, comprising filler and aluminum as the parent metal, is placed in a furnace that is supplied with a suitable vapor-phase oxidant, and the setup is heated to or within a temperature region above the melting point of the parent metal but below the melting point of the oxidation reaction product. The process temperature range for aluminum parent metal using air as the vapor-phase oxidant generally is between about 700°-1450° C., and more preferably between about 800°-1350° C. Within the operable temperature interval or preferred temperature range, a body or pool of molten metal forms, and on contact with the oxidant, the molten metal will react to form a layer of oxidation reaction product. Upon continued exposure to the oxidizing environment, within an appropriate temperature region, the remaining molten metal is progressively drawn into and through the oxidation reaction product in the direction of the oxidant. On contact with the oxidant, the molten metal will react to form additional oxidation reaction product. At least a portion of the oxidation reaction product is maintained in contact with and between the molten parent metal and the oxidant so as to cause continued transport of the molten metal through the formed oxidation reaction product toward the oxidant such that the polycrystalline oxidation reaction product infiltrates at least a portion of the filler material. The coating of silicon source produced on the filler material, as by prefiring in situ, or precoating, enhances the growth of the polycrystalline oxidation reaction product by supplying a continuous source of silicon dopant material throughout the volume of filler.

The process is continued until the oxidation reaction product has infiltrated at least a portion of the bed of filler material. If a preform is used, the process is continued until the oxidation reaction product has infiltrated and embedded the constituents of the preform to a defined surface boundary, and desirably not beyond, which would be an "over-growth" of the polycrystalline matrix material.

It should be understood that the resulting polycrystalline matrix material may exhibit porosity which may be a partial or nearly complete replacement of the metal constituents, but the volume percent of voids will depend largely on such conditions as temperature, time, type of parent metal, and dopant concentrations. Typically in these polycrystalline ceramic structures, the oxidation reaction product crystallites are interconnected in more than one dimension, preferably in three dimensions, and the metal or pore constituents may be at least partially interconnected. The resulting ceramic composite product will possess the dimensions and geometric configuration of the original preform if used, and especially good fidelity is achieved by the use of a barrier means.

The vapor-phase oxidant used in the oxidation reaction process is normally gaseous or is vaporized at the process conditions, which provides an oxidizing atmosphere such as atmospheric air. However, when a prefired or precoated filler is used, the oxidant need not be an oxygen-containing gas. Typical vapor (gas) oxidants, which use may depend on whether the filler has been prefired or precoated, include additionally, for example, nitrogen or a nitrogen-containing gas, and mixtures such as air, $H_2/H_2O$ and $CO/CO_2$, the latter two (i.e., $H_2/H_2O$ and $CO/CO_2$) being useful in reducing the oxygen activity of the environment relative to desirable oxidizable constituents of the preform. Oxygen or gas mixtures containing oxygen (including air) are suitable vapor-phase oxidants, with air usually being more preferred for obvious reasons of economy. When a vapor-phase oxidant is identified as containing or comprising a particular gas or vapor, this means a vapor-phase oxidant in which the identified gas or vapor is the sole, predominant or at least a significant oxidizer of the parent metal under the conditions obtained in the oxidizing environment utilized. For example, although the major constituent of air is nitrogen, the oxygen content of air is the sole oxidizer of the parent metal under the conditions obtained in the oxidizing environment utilized. Air therefore falls within the definition of an "oxygen-containing gas" oxidant but not within the definition of a "nitrogen-containing gas" oxidant. An example of a nitrogen-containing oxidant as used herein and in the claims is "forming gas", which typically contains about 96 volume percent nitrogen and about 4 volume percent hydrogen.

An oxidant which is liquid or solid at the process conditions may be employed in conjunction with the vapor-phase oxidant. Such additional oxidants may be particularly useful in enhancing oxidation of the parent metal preferentially within the filler material rather than beyond its surfaces. That is, the use of such additional oxidants may create an environment within the filler material more favorable to oxidation kinetics of the parent metal than the environment outside the filler bed or preform. With respect to the silicon carbide filler material employed as a preform, this enhanced environment is beneficial in promoting matrix development within the preform to the boundary and minimizing overgrowth.

When a solid oxidant is employed additionally to the vapor-phase oxidant, it may be dispersed through the entire volume of the filler material, or through a portion only of filler material adjacent the parent metal, such as in particulate form and admixed with the filler material. Any suitable solid oxidant may be employed depending upon its compatibility with the vapor-phase oxidant. Such solid oxidants may include suitable elements, such as boron, or suitable reducible compounds, such as certain borates, borate glasses, silicates and silicate glasses of lower thermodynamic stability than the oxidation reaction product of the parent metal.

If a liquid oxidant is employed additionally to the vapor-phase oxidant, the liquid oxidant may be dispersed throughout the entire volume of bed of filler material or a portion of the filler material adjacent to the molten metal, provided such liquid oxidant does not prevent access of the vapor-phase oxidant to the molten parent metal. Reference to a liquid oxidant means one which is liquid under the oxidation reaction conditions, and so a liquid oxidant may have a solid precursor, such as a salt, which is molten or liquid at the oxidation reaction conditions. Alternatively, the liquid oxidant may be a liquid precursor, e.g., a solution of a material, and which is melted or decomposed at the process conditions to provide a suitable oxidant moiety. Examples of liquid oxidants as herein defined include low melting glasses.

If a shaped preform is used, the preform should be sufficiently porous or permeable to allow the vapor-phase oxidant to permeate the preform and contact the molten parent metal. The preform also should be sufficiently permeable to accommodate growth of the oxidation reaction product within its boundaries without substantially disturbing, upsetting or otherwise altering its configuration or geometry. In the event the preform includes a solid oxidant and/or liquid oxidant which may accompany the vapor-phase oxidant, the preform then should be sufficiently porous or permeable to permit and accept growth of the oxidation reaction product originating from the solid and/or liquid oxidant.

The present invention provides in one embodiment a composite filler material which, when heated to a suitable temperature in an oxygen-containing atmosphere, provides an intrinsic source of a dopant material; that is, for example, silicon carbide as filler is an intrinsic source of silicon dioxide as a dopant. In certain applications it may be necessary or desirable to employ an additional dopant material to supplement that intrinsically supplied by the silicon source. When one or more dopants are used in addition to the silicon source, they: (1) may be provided as alloying constituents of the aluminum parent metal, (2) may be applied to at least a portion of the surface of the parent metal, or (3) may be applied to or incorporated into part or all of the filler material, or any combination of two or more techniques (1), (2) and (3) may be employed. For example, a dopant alloyed with the parent metal may be used solely or in combination with a second externally applied dopant in conjunction with the silicic compound coating. In the case of technique (3), where additional dopant or dopants are applied to the filler material, the application may be accomplished in any suitable manner as explained in the Commonly Owned Patent Applications. The function or functions of a dopant material can depend upon a number of factors other than the dopant material itself. Such factors include, for example, the particular combination of dopants when two or more dopants are used, the use of an externally applied dopant in combination with a dopant alloyed with the parent metal, the concentration of the dopant, the oxidizing environment, and the process conditions.

Dopants useful in combination with a silicon source as dopant for the aluminum parent metal, particularly with air as the oxidant, include magnesium and zinc, which may be used in combination with other dopants, as described below. These metals, or a suitable source of the metals, may be alloyed into the aluminum-based parent metal at concentrations for each of between about 0.1–10% by weight based on the total weight of the resulting doped metal. Where desired, silicon metal may be alloyed with the parent metal to supplement the silicon source as coating on a filler. In such examples, a preferred magnesium concentration falls within the range of from about 0.1 to about 3% by weight, for silicon in the range of from about 1 to about 10% by weight, and for zinc when used with magnesium in the range of from about 1 to about 6% by weight. These dopant materials or a suitable source thereof (e.g. MgO and ZnO) may be used externally to the parent metal. Thus an alumina ceramic structure is achievable for the aluminum parent metal using air as the oxidant by using MgO as a dopant in an amount greater than about 0.0008 gram per gram of parent metal to be oxidized and greater than 0.003 gram per square centimeter of parent metal upon which the MgO is applied.

Additional examples of dopant materials effective with aluminum parent metals reacting with an oxygen-containing atmosphere include sodium, germanium, tin, lead, lithium, calcium, boron, phosphorus, and yttrium which may be used individually or in combination with one or more other dopants depending on the oxidant and process conditions. Rare earth elements such as cerium, lanthanum, praseodymium, neodymium, and samarium are also useful dopants, and herein again especially when used in combination with other dopants. All of the dopant materials as explained in the Commonly Owned Patent Applications, in addition to the coating of silicon source, are effective in promoting polycrystalline oxidation reaction product growth for the aluminum-based parent metal systems.

The ceramic composite product obtained by the practice of the present invention will usually be a coherent product wherein between about 5% and about 98% by volume of the total volume of the ceramic composite product is comprised of filler embedded by a polycrystalline ceramic matrix. The polycrystalline ceramic matrix is usually comprised of, when air or oxygen is the oxidant, about 60% to about 99% by volume (of the volume of polycrystalline matrix) of interconnected α-aluminum oxide and about 1% to 40% by weight (same basis) of metallic constituents such as non-oxidized constituents of the parent metal or reduced metal from the dopant or the oxidant.

As disclosed in copending U.S. patent application Ser. No. 861,024, filed May 8, 1986, and assigned to the same assignee, a barrier means may be used in conjunction with the filler material to inhibit growth or development of the oxidation reaction product beyond the barrier. Suitable barrier means may be any material, compound, element, composition, or the like, which, under the process conditions of this invention, maintains some integrity, is not volatile, and preferably is permeable to the vapor-phase oxidant while being capable of locally inhibiting, poisoning, stopping, interfering with, preventing, or the like, continued growth of oxidation reaction product. Calcium sulfate (Plaster of Paris), calcium silicate, and portland cement and mixtures thereof, which are particularly useful with aluminum as the parent metal and an oxygen-containing gas oxidant, typically are applied as a slurry or paste to the surface of the filler material. These barrier means also may include a suitable combustible or volatile material that is eliminated on heating, or a material which decomposes on heating, in order to increase the porosity and permeability of the barrier means. Still further, the barrier means may include a suitable refractory particulate to reduce any possible shrinkage or cracking which otherwise may occur during the process. Such a particulate having substantially the same coefficient of expansion as that of the filler bed is especially desirable. For example, if the preform comprises alumina and the resulting ceramic comprises alumina, the barrier may be admixed with alumina particulate, desirably having a mesh size of about 20–1000.

The following examples illustrate the practice of certain aspects of the invention.

Example 1

In accordance with the present invention, a cermic structure was fabricated comprising an alumina oxidation reaction product embedding $\beta$-SiC whiskers supplied by NIKKEI TECHNO-RESEARCH COMPANY, LTD., initially coated with either a commercial colloidal silica (Ludox HS-30 from Du Pont Company) or a sodium silicate solution (40°–42° Baume) as supplemental sources of silicon.

Three preforms, measuring 2 inches in diameter and $\frac{3}{8}$ inch thick, were made by mixing three separate batches of $\beta$-SiC whiskers with a liquid medium, pouring the resulting slurry into a mold, and then degassing and drying in a vacuum dissicator. The liquid media that were mixed with the $\beta$-SiC whiskers included distilled water as a control, colloidal silica, and sodium silicate solution. The preforms were placed on a bed of 90 grit El Alundum (from Norton Company) contained in a refractory boat. Aluminum alloy ingots (No. 712.2) with the same diameter as the preforms had one side coated with a thin layer of sand, and the coated side of each ingot was placed in contact with the upper surface of a preform. This setup was placed in a furnace and heated to 900° C. in 5 hours. This temperature was held for 36 hours, and the setup was cooled to ambient temperature in 5 hours. The infiltration of the alumina oxidation reaction product was negligible in the preform containing only the $\beta$-SiC whiskers (the control using distilled water). The $\beta$-SiC whiskers coated with colloidal silica were infiltrated through the entire thickness of the preform. The infiltration of the $\beta$-SiC whiskers with sodium silicate solution occurred to approximately the center of the preform.

Example 2

In accordance with the present invention, a ceramic composite structure was fabricated comprising an alumina oxidation reaction product embedding particles of silicon carbide filler material (39 Crystolon, 500 grit from Norton Co.) initially coated with colloidal silica (Ludox HS-30, from Du Pont Company, 30% solution) as a source of silicon.

The colloidal silica coating on the silicon carbide particles was done by preparing two preforms measuring $2 \times 2 \times \frac{1}{2}$ inches by sediment casting into a rubber mold a mixture of silicon carbide particles (500 grit) and colloidal silica at a two-to-one powder to liquid ratio. Upon setting up and drying, one of the preforms was crushed and passed 100% through 100 mesh. This crushed colloidal silica coated silicon carbide was then sediment cast again utilizing a 2% acrylic latex binder (Elmer's Wood Glue, Borden Co.). A preform identical to those above was prepared with silicon carbide not coated with colloidal silica utilizing only the latex binder.

Figure 3A:
Figure 3B:
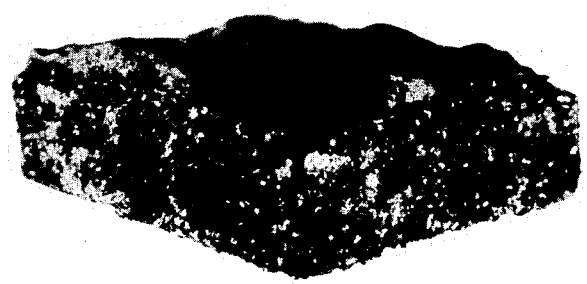

Three bars of aluminum alloy 712 (having a nominal composition by weight of 0.15% Si, 0.6% Mg, 6% Zn) were placed into a refractory bed of Wollastonite fibers (NYAD FP from Petty-Rowley Chemical Co.) which was contained in a refractory vessel, such that one 2×2 face of each bar was exposed to the atmosphere and substantially flush with the bed. The three above-described preforms were placed one each on top of the alloy bars such that one 2×2 face of each respective preform and alloy were substantially aligned. A layer of Wollastonite fibers was dispersed over the top of the preforms to mitigate overgrowth of the ceramic matrix beyond the preform boundaries. This setup was placed into a furnace and heated up over 10 hours to 1000° C. The furnace was held at 1000° C. for 80 hours, and cooled down to ambient over 10 hours. The setup was removed from the furnace, and the resulting ceramic composite structures were recovered. The resulting composites were sandblasted lightly to remove unembedded preform materials. FIGS. 1(a), 1(b), 2(a), and 2(b) are photographs of the resulting composite materials utilizing preforms with the colloidal silica coating (FIGS. 2(a) and 2(b) involving the recast preform), which illustrate good growth; and FIGS. 3(a) and 3(b) show the resulting composite utilizing no silica coating. As apparent from the figures, the preforms employing the silica coated particles were embedded substantially to their dimensional boundaries, while the non-silica containing preform showed substantially less infiltration by the ceramic matrix.

Example 3

In accordance with the present invention, a ceramic composite structure was fabricated comprising an alumina oxidation reaction product embedding particles of boron nitride which were coated with silicon.

Figure 4:
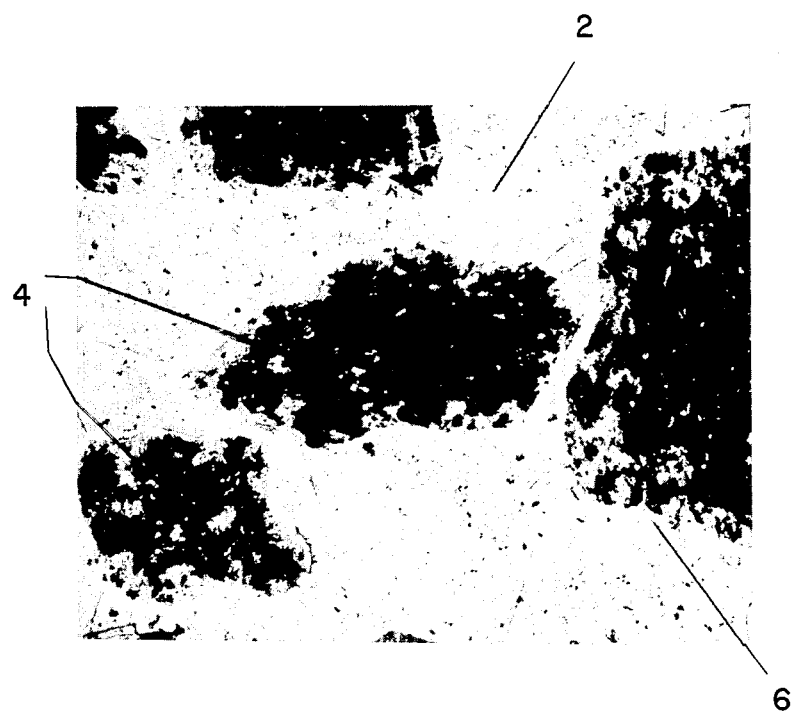
FIG. 4 is a photomicrograph at 50X of a composite structure showing coated filler particles embedded by a ceramic matrix prepared in accordance with Example 3.

A bar of aluminum alloy 380.1 (from Belmont Metals, having a nominally identified composition by weight of 8-8.5% Si, 2-3% Zn, and 0.1% Mg as active dopants, and 3.5% Cu as well as Fe, Mn, and Ni, but the Mg content was sometimes higher as in the range of 0.17-0.18%) was submerged into a bed of boron nitride particles (approximately 50 mesh size). The boron nitride particles were coated with silicon (accomplished by chemical vapor deposition) to protect the boron nitride from degradation and to serve as a source of silicon dopant, which supplemented the silicon source in the alloy. This bed was contained in a refractory vessel. This setup was placed into a furnace which had an opening to facilitate the passage of air, and heated up over 5 hours to 1100° C. The furnace was held at 1100° C. for 48 hours, and cooled down to ambient. The resulting ceramic composite was recovered. FIG. 4 is a photomicrograph at 50X of the composite which shows the alumina matrix 2 embedding the particles of boron nitride 4 still bearing some of the silicon coating 6.

The above examples demonstrate the utility of a filler material with a silicon source having intrinsic doping properties for enhancing composite formation. Although only a few exemplary embodiments of this invention have been described in detail above, those skilled in the art will readily appreciate that the present invention embraces many variations other than those exemplified.

What is claimed is:

1. A method for producing a self-supporting ceramic composite comprising a ceramic matrix obtained by oxidation of an aluminum parent metal to form a polycrystalline material comprising oxidation reaction product of the parent metal with at least one oxidant including a vapor-phase oxidant and a filler infiltrated by said matrix, said method comprising: (A) orienting said aluminum parent metal and a filler material relative to each other so that formation of the oxidation reaction product will occur in a direction towards and into said filler, said filler material bearing a coating of a silicon source on at least a portion of said filler different in composition from a primary composition of said filler, said silicon source possessing intrinsic doping properties; (B) heating said aluminum parent metal to a temperature above its melting point but below the melting point of the oxidation reaction product to form a body of molten aluminum parent metal; (C) reacting the molten aluminum parent metal with said oxidant at said temperature to form the oxidation reaction product; (D) maintaining at said temperature at least a portion of said oxidation reaction product in contact with and between said body of molten metal and said oxidant, to progressively draw molten metal through the oxidation reaction product towards the oxidant and into the filler material so that fresh oxidation reaction product continues to form within said filler at an interface between the oxidant and previously formed oxidation reaction product; and (E) continuing said reaction for a time sufficient to infiltrate at least a portion of said filler with said polycrystalline material.

2. The method of claim 1, wherein said silicon source comprises a silicic compound reducible by said molten parent metal under the process conditions.

3. The method of claim 1, wherein said coating of said silicon source is produced by oxidation or dissociation of a silicic precursor.

4. The method of claim 3, wherein said oxidation or dissociation to produce said coating of said silicon source is conducted prior to said orienting step in (A).

5. The method of claims 3, or 4, wherein said oxidation to form said coating is conducted by heating said silicon source in the presence of an oxygen-containing atmosphere to form a coating of silica.

6. The method of any of claims 1, 2, 3, or 4, wherein said filler comprises a material selected from the group consisting of silicon carbide, silicon nitride, alumina, zirconia, and boron nitride.

7. The method of any of claims 1, 2, 3, or 4, wherein said heating step in (B) is at a temperature of from about 700° C. to about 1450° C.

8. The method of any of claims 1, 2, 3, or 4, additionally comprising using at least one dopant material, in addition to said silicon source, in conjunction with said parent metal.

9. The method of any of claims 1, 2, 3, or 4, additionally comprising shaping said filler material into at least one permeable, self-supporting preform.

10. The method of claim 9, additionally comprising overlaying at least a portion of said preform with a barrier means for inhibiting the formation of said oxidation reaction product therebeyond.

11. The method of any of claims 1, 2, 3, or 4, further comprising incorporating at least one additional oxidant selected from the group consisting of a solid oxidant and a liquid oxidant into at least a portion of said filler material, and reacting said molten metal with said at least one additional oxidant, so that said polycrystalline material further comprises the oxidation reaction product of said parent metal with said at least one additional oxidant.

12. The method of claim 1 or claim 2, wherein said silicon source comprises at least one material selected from the group consisting of silica, a silicate, and silicon.

13. The method of claim 4, wherein said oxidation to produce said coating utilizes an oxidant comprising an oxidant selected from the group consisting of a nitrogen-containing gas, an oxygen-containing gas and mixtures thereof.

14. A method for producing a self-supporting ceramic composite comprising a ceramic matrix obtained by oxidation of an aluminum parent metal to form a polycrystalline material comprising oxidation reaction product of the parent metal with at least one oxidant including a vapor-phase oxidant and a filler infiltrated by said matrix, said method comprising:

(a) orienting said aluminum parent metal and a filler material relative to each other so that formation of the oxidation reaction product will occur in a direction towards and into said filler;

(b) heating said aluminum parent metal and said filler to a temperature above the melting point of the parent metal but below the melting point of the oxidation reaction product to form a body of molten aluminum parent metal, said filler oxidizing or dissociating at said temperature to produce a coating of a silicon source on at least a portion of said filler different in composition from a primary composition of said filler, said silicon source possessing intrinsic doping properties;

(c) reacting the molten aluminum parent metal with said oxidant at said temperature to form the oxidation reaction product;

(d) maintaining at said temperature at least a portion of said oxidation reaction product in contact with and between said body of molten metal and said oxidant, to progressively draw molten metal through the oxidation reaction product towards the oxidant and into the filler material so that fresh oxidation reaction product continues to form within said filler at an interface between the oxidant and previously formed oxidation reaction product; and (e) continuing said reaction for a time sufficient to infiltrate at least a portion of said filler with said polycrystalline material.

15. The method of claim 14, wherein said oxidation to form said coating is conducted by heating said silicon source in the presence of an oxygen-containing atmosphere to form a coating of silica.

16. The method of claim 14, wherein said heating step in (b) is at a temperature of from about 700° C. to about 1450° C.

17. The method of claim 14, wherein said heating step in (b) is conducted in the presence of an oxygen-containing atmosphere at a temperature of from about 1000° C. to about 1450° C. to produce said coating of said silicon source, and after said coating has formed in situ on a substantial portion of said filler, altering the temperature to continue formation of said oxidation reaction product.

18. The method of claim 14, further comprising using at least one dopant material, in addition to said silicon source, in conjunction with said parent metal.

19. The method of claim 14, further comprising shaping said filler material into at least one permeable, self-supporting preform.

20. The method of claim 14, further comprising overlaying at least a portion of said preform with a barrier means for inhibiting the formation of said oxidation reaction product therebeyond.

21. The method of claim 14, further comprising incorporating at least one additional oxidant selected from the group consisting of a solid oxidant and a liquid oxidant into at least a portion of said filler material, and reacting said molten metal with said at least one additional oxidant, so that said polycrystalline material further comprises the oxidation reaction product of said parent metal with said at least one additional oxidant.

22. The method of claim 1 or claim 14, wherein said vapor-phase oxidant used to form said oxidation reaction product comprises an oxidant selected from the group consisting of a nitrogen-containing gas, an oxygen-containing gas and mixtures thereof.

23. The method of claim 22, wherein said vapor-phase oxidant comprises an oxidant selected from the group consisting of air, a $H_2/H_2O$ mixture, a $CO/CO_2$ mixture, and mixtures thereof.

* * * * *

UNITED STATES PATENT AND TRADEMARK OFFICE
CERTIFICATE OF CORRECTION

PATENT NO. : 4,847,220

DATED : July 11, 1989

INVENTOR(S) : H. Daniel Lesher et al.

It is certified that error appears in the above-identified patent and that said Letters Patent is hereby corrected as shown below:

Column 2, line 33: after "1986" insert a comma.
Column 2, line 46: after "1986" insert a comma.
Column 2, line 59: after "1986" insert a comma.
Column 2, line 64: after "1986" insert a comma.
Column 4, line 18: change "and therefore" to --and, therefore,--.
Column 9, line 37: change "Air therefore" to --Air, therefore,--.
Column 12, line 14: change "cermic" to --ceramic--.
Column 14, line 38: change "claims 3, or 4," to --claim 3 or claim 4,--.
Column 16, line 9: change "about, 700°C" to --about 700°C--.

Signed and Sealed this

Twenty-first Day of November, 1995

Attest:

BRUCE LEHMAN

Attesting Officer

Commissioner of Patents and Trademarks